(12) United States Patent
Freund

(10) Patent No.: US 6,456,993 B1
(45) Date of Patent: Sep. 24, 2002

(54) ALTERNATING TREE-BASED CLASSIFIERS AND METHODS FOR LEARNING THEM

(75) Inventor: Yoav Freund, Hoboken, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/472,783

(22) Filed: Dec. 28, 1999

Related U.S. Application Data

(60) Provisional application No. 60/119,266, filed on Feb. 9, 1999.

(51) Int. Cl.[7] .............................................. G06F 17/00
(52) U.S. Cl. ......................................... 706/46; 706/47
(58) Field of Search ..................................... 706/47, 46

(56) References Cited

U.S. PATENT DOCUMENTS

| | | | | |
|---|---|---|---|---|
| 4,719,571 A | * | 1/1988 | Rissanen et al. ............. | 707/101 |
| 5,806,056 A | * | 9/1998 | Hekmatpour .................. | 706/50 |
| 5,819,247 A | | 10/1998 | Freund et al. ................. | 706/25 |
| 6,230,151 B1 | * | 5/2001 | Agrawal et al. ............... | 706/12 |
| 6,260,042 B1 | * | 7/2001 | Curbera et al. ............. | 707/101 |
| 6,321,217 B1 | * | 11/2001 | Maeda et al. .................. | 706/47 |

OTHER PUBLICATIONS

Schapire, Robert E., et al., *Improved Boosting Algorithms Using Confidence–rated Predictions*, pp. 1–40.
Freund, Yoav, et al., *The alternating decision tree learning algorithm*, 1999, pp. 1–16.
Freund, Yoav, *An introduction to boosting based classification*, pp. 1–11.

\* cited by examiner

*Primary Examiner*—George B. Davis

(57) ABSTRACT

This invention provides methods and systems for classification of data instances using tree-based classifiers. Tree-based classifiers are first built according to a particular structure using a technique known as "boosting" wherein simple rules are successively added to the tree-based classifier until the unit tree-based classifier exhibits satisfactory error performance. The resulting classifier can then accurately classify an instance of data submitted to it and the classifier can optionally provide a measure of confidence for the classification result produced by the tree-based classifier.

12 Claims, 3 Drawing Sheets

ALTERNATING TREE-BASED CLASSIFIERS AND METHODS FOR LEARNING THEM

This application claims the benefit of U.S. Provisional application No. 60/119,266 filed Feb. 9, 1999

BACKGROUND OF THE INVENTION

1. Field of Invention

This invention relates to methods and systems for tree-based classifiers.

2. Description of Related Art

Early tree-based classifiers and learning techniques based on these classifiers such as CART (Breiman, Olshen and Stone) and C4.5 (Quinlan) had three problems. The first problem was that the rules produced by these classifiers were of limited accuracy. The second problem was that the rules produced by these classifiers were usually complex and thus, difficult to understand. The third problem was that users had no indication as to the reliability of the results of a particular query.

To overcome these problems, the technique of "boosting" was developed. An example of one popular boosting technique is Adaboost which is described in U.S. Pat. No. 5,819,247 incorporated herein by reference in its entirety. Boosting is a technique that develops highly accurate hypothesis (classification rules) by combining many weak hypotheses, each of which is only moderately accurate. The idea behind boosting such tree-based classifiers is to successively add simple rules to form more complex decision making criteria until the tree-based classifier exhibits satisfactory performance.

Although tree-based classifiers produced by boosting techniques achieve significant improvement in accuracy and provide a measure of confidence for each prediction, the resulting classifiers are still complex and the classification rules produced are still difficult to understand. Thus, methods and systems that produce highly accurate classifiers while generating rules that are small in size and easy to interpret are desirable.

SUMMARY OF THE INVENTION

The present invention provides methods and systems for creating and modifying general alternating decision tree classifiers. The general alternating decision tree classifiers include a root prediction node attached directly or indirectly to a set of rules, each rule having a decision node and two prediction nodes. The decision nodes contain conditional tests that can act on a data instance. The prediction nodes, including the root prediction node, contain numbers related to the probable classifications of data instances. Together, the decision nodes and prediction nodes form a construct of alternating decision nodes and prediction nodes that can classify data instances into subsets.

General alternating decision trees are created by first determining a root prediction node. The general alternating decision trees are then grown by iteratively adding rules consisting of a decision node and two prediction nodes. At each stage, the decision node of a new rule can be added as a child of any prediction node of a preexisting rule. Any number of rules may directly attach to any prediction node on the general alternating decision tree including the root prediction node. The new rules are added according to the underlying boosting technique. Accordingly, a "general alternating decision tree" of rules is formed.

The present invention can also provide methods and apparatus for classifying data instances using general alternating decision tree classifiers. Given a data instance, the general alternating decision tree maps the data instance by exploring the tree from the root prediction node to the end prediction nodes, or leaves. At each decision node in the tree, only the prediction node child that corresponds to the outcome of the conditional test based on the data instance is explored. At each prediction node, all the decision node children branching from the prediction node are explored. The confidence values contained in all the prediction nodes explored are then added. The sign of the sum is the classification of the data instance and the magnitude of the sum corresponds to a measure of confidence of the classification.

BRIEF DESCRIPTION OF THE DRAWINGS

The invention is described in detail with reference to the following figures, wherein like numerals reference like elements, and wherein.

DETAILED DESCRIPTION OF PREFERRED EMBODIMENTS

Classification systems can be used in a wide variety of fields including situations where a product developer or service provider must determine risk assessment or classify problems based on a few standard measurements. For example, physicians can desire to assess the risk a patient might pose for heart disease based on relevant measurements such a blood pressure, heart rate and cholesterol. For any given set of measurements, such a classification system can return a value "healthy" or "not healthy." To provide accurate classifications, the classification techniques can be developed using test data that statistically represents the subject matter. For the medical example above, a set of ten-thousand case examples of former patients whose blood pressure, heart rate and cholesterol were measured along with the diagnosis for each patient can be used to create an accurate classification system.

Figure 1:
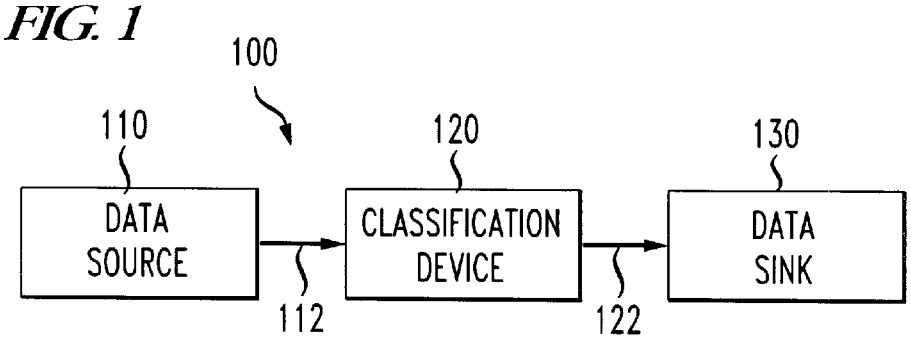
FIG. 1 is an exemplary block diagram of a classification system in accordance with the present invention.

FIG. 1 shows an exemplary block diagram of a classification system 100. The system 100 includes a classification device 120 connected to a data source 110 via an input link 112 and to a data sink 130 via an output link 122. The classification device performs at least two functions. The first function of the classification device 120 is to build or develop various new classifiers. A classifier is a system or method that will accept an instance of data having a set of elements and classify the data into one of two categories. The second function of the classification device 120 is to use a classifier to classify any pertinent instance of data presented to the classifier. For the example above, the medical classifier can accept data instances with the elements blood pressure, heart rate and cholesterol to produce a "healthy" or "not healthy" result.

The classification device 120 can receive sets of training data and/or data instances from the data source 110 via link 112. A data instance can be any set of data with one or more related elements. An instance of training data in a set of training data can include any set of data with one or more related elements plus the known classification associated with the related elements. For example, an instance of training data can contain two elements, "blood pressure" and "heart rate" along with a classification "healthy" or "not healthy" corresponding to the two elements. A set of 100 or so training instances can be used to build a classifier that can take data instances with the elements "blood pressure" and "heart rate" and classify it "healthy" or "not healthy."

Alternatively, the classification device 120 can receive any number of data instances pertinent to a classifier in its possession, classify them accordingly and can then send the results to the data sink 130 via link 122. For example, with reference to the classifier discussed above, the data source 110 can send any number of data instances with the elements "blood pressure" and "heart rate" to the classification device 120 to produce classifications for each data instances along with measures of confidence relating to the classifications. A measure of confidence is a measure relating to the likelihood that a particular classification is correct.

To create new classifiers, the classification device 120 can use a technique known as "boosting". Boosting is a method of finding a highly accurate hypothesis (classification rule) by combining many weak hypothesis, each of which is only moderately accurate. Typically, each weak hypothesis is a simple rule which can be used to generate a predicted classification for any instance of data. The idea behind boosting such tree-based classifiers is to successively add simple rules to form more complex decision making criteria until the tree-based classifier exhibits satisfactory performance. Boosting techniques are discussed in detail in Schapire, Robert E. and Singer, Yoram, "Improved Boosting Algorithms Using Confidence-Rated Predictions", Proceedings of the Eleventh Annual Conference on Computational Learning Theory COLT98 (1998), pp. 80–91, and Freund, Yoav and Mason, Llew, "The Alternating Decision Tree Learning Algorithm", Machine Learning: Proceedings of the Sixteenth International Conference ICML99 (1999), pp. 124–133, both of which are incorporated herein by reference in their entirety.

After the classification device 120 builds a new classifier, the classification device 120 can classify a data instance by processing the data instance using a general alternating decision tree classifier. After the particular data instance is classified, the classification device 120 provides the result to the data sink 130 via link 122. Optionally, the classification device 120 can also provide a measure of confidence as to the accuracy of the binary classification.

The data source 110 can provide the classification device 120 with sets of training data or data instances via the input link 112. The data representing the data instances and predetermined status can be in any format, such as binary, ASCII or a word processing file. The data source 110 can be any one of a number of different types of data sources, such as a computer, a storage device, or any combination of software and hardware capable of generating, relaying, or recalling from storage any information capable of creating classifiers or being classified.

The data sink 130 can receive binary classifications and measures of confidence from the classification device 120 via the output link 122. The data sink 130 can be any device capable of receiving classifications of data instances and measures of confidence such as a digital computer, a storage medium, a transceiver, or any combination of hardware and software capable of receiving, relaying, storing, sensing or perceiving information representing binary classifications and measures of confidence.

The links 112 and 122 can be any known or later developed device or system for connecting the data source 110 or the data sink 130 to the classification device 120. Such devices include a direct serial/parallel cable connections, a connection over a wide area network or a local area network, a connection over an intranet, a connection over the Internet, or a connection over any other distributed processing network or system. Additionally, the input link 112 or the output link 122 may be software devices linking various software systems. In general, the links 112 and 122 can be any known or later developed connection system, computer program, or structure useable to connect the data source 110 or the data sink 130 to the classification device 120.

Figure 2:
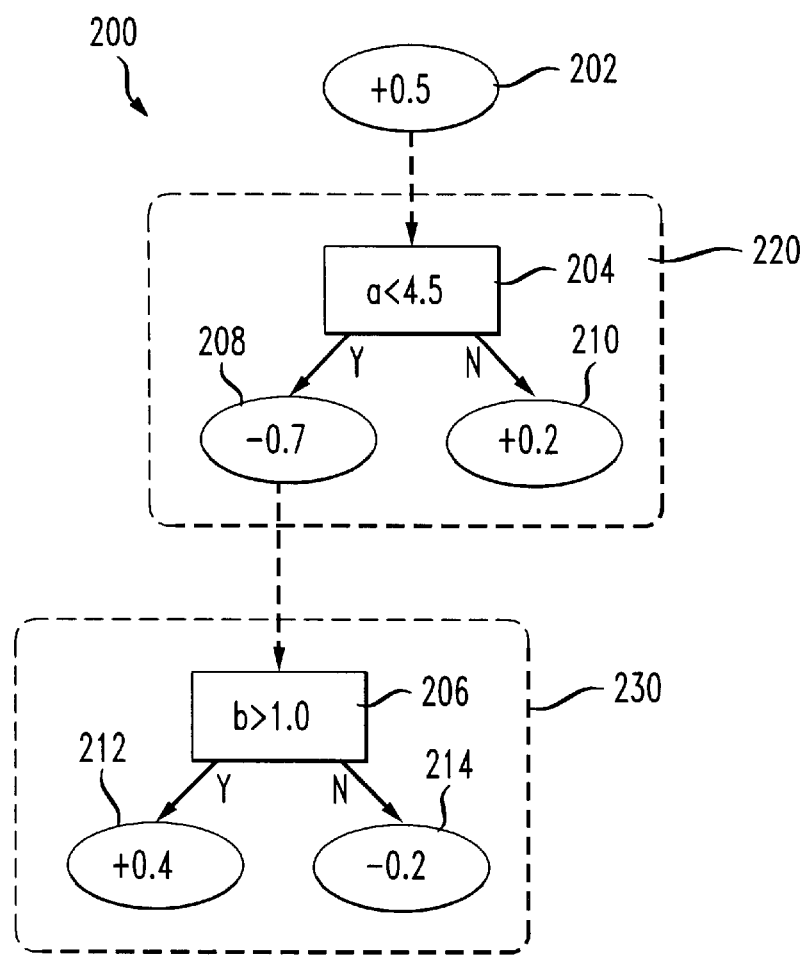
FIG. 2 is an exemplary diagram of an alternating decision tree classifier.

FIG. 2 is an exemplary alternating decision tree classifier 200 with a root prediction node 202, two decision nodes 204 and 206, and four prediction nodes 208, 210, 212 and 214. The root prediction node 202 contains a value related to a statistical assumption that any data instance presented to the alternating decision tree 200 will likely produce a particular result. For example, if the training set of data used to create the alternating decision tree 200 had a majority of positive outcomes, the root prediction node will subsequently contain a positive value indicating that the likely outcome before applying any rule is also positive.

A decision node 204 or 206, or splitter node, is a conditional test that can act upon a particular element of a data instance. The result of each decision node is "yes" or "no" indicating that the element of data presented to the decision node either met the condition or it did not. For example, a data instance with an element (a)=1 presented to decision node 204 will produce a "yes" result.

A prediction node 208–214 contains a value that is a statistical measure as to the change in likelihood a given data instance will produce a particular result. For the example above, the data instance with element (a)=1 presented to decision node 204 will produce a "yes" result. The resulting path will cross prediction node 208. Because prediction node 208 contains a "–0.7" value, the prediction node 208 makes the likelihood of a negative classification more likely.

For an alternating decision tree classifier 200, decision nodes 204–206 and prediction nodes 208–214 can be grouped to form rules, which can easily be interpreted by developers, such as physicians, insurance companies or anyone else who can benefit from a rule based classification system. In the exemplary alternating decision tree classifier 200, the first decision node 204 and the first two classifiers 208 and 210 form a first rule 220 operating on element (a) and the second decision node 204 and the last two classifiers 212 and 214 form a second rule 230 operating on element (b). Each decision node and subsequent two prediction nodes can be associated with a simple rule of the form:

if(precondition) then
      if(condition) then output p1
      else output p2
   else output 0 where p1 is the value in the prediction node 208 or 212 associated with a true occurrence of the condition of the decision node 204 or 206 and p2 is the value of the prediction node 210 or 214 associated with the false occurrence of the condition of the decision node 204 or 206. The condition of a given rule is the logical rule within the respective decision node 204–206 and the precondition of a given rule is the logical conjunction all preceding decision nodes, if any, starting from the root prediction node 202. For the exemplary alternating decision tree 200 of FIG. 2, the first and second rules 220 and 230 can be written as:

Rule 1(a,b)=if(always) then
    if(a<4.5) then output −0.7
    else output +0.2
    else output 0
Rule 2(a,b)=if(a<4.5) then
    if(b>1.0) then output +0.4
    else output −0.2
    else output 0 where (a) and (b) are elements of $R^2$, i.e., (a) and (b) are both members of the predetermined set $R^2$ which contains two elements, and (a) and (b) can be presented to the classifier 200 to produce a classification.

As shown above, for the first rule 220, there is no precondition as there are no preceding decision nodes, and the condition is derived from decision node 204. The precondition for the second rule is the conjunction of all preceding decision nodes, i.e., decision node 204, and the condition of the second rule is derived from decision node 206.

For any data instance presented to the exemplary classifier 200 of FIG. 2, the classifier 200 can process the data instance by mapping a path along the classifier 200 starting from the root prediction node 202 that subsequently satisfies rules 220 and 230. For example, for the instance (a, b)=(2.5, 2.5) the path mapped starts at the root node 202, then proceeds to first decision node 204, then prediction node 208, decision node 206 and finally to prediction node 212.

After the path is mapped, the alternating decision tree classifier 200 can add the prediction nodes 208–214 along the mapped path to form a sum. The instance of data can then be classified by determining the sign of the sum. If the sign of the sum is positive, the classifier 200 outputs +1, otherwise, the alternating decision tree classifier 200 outputs −1. Given that the classifier 200 may produce an incorrect classification, the sum used to classify the data instance can also be used as a measure of confidence reflecting the expected accuracy of the resulting classification. Generally, the greater the absolute value of a measure of confidence, the more likely the resulting classification is correct.

For the example above, given the data instance (a, b)=(2.5, 2.5), the classification is the sign of the sum of prediction nodes 202, 208 and 212=sign(+0.5−0.7+0.4)=sign(+0.2)=+1. The classification of the instance of data (a, b)=(2.5, 2.5) is therefore +1 with a measure of confidence of +0.2.

Figure 3:
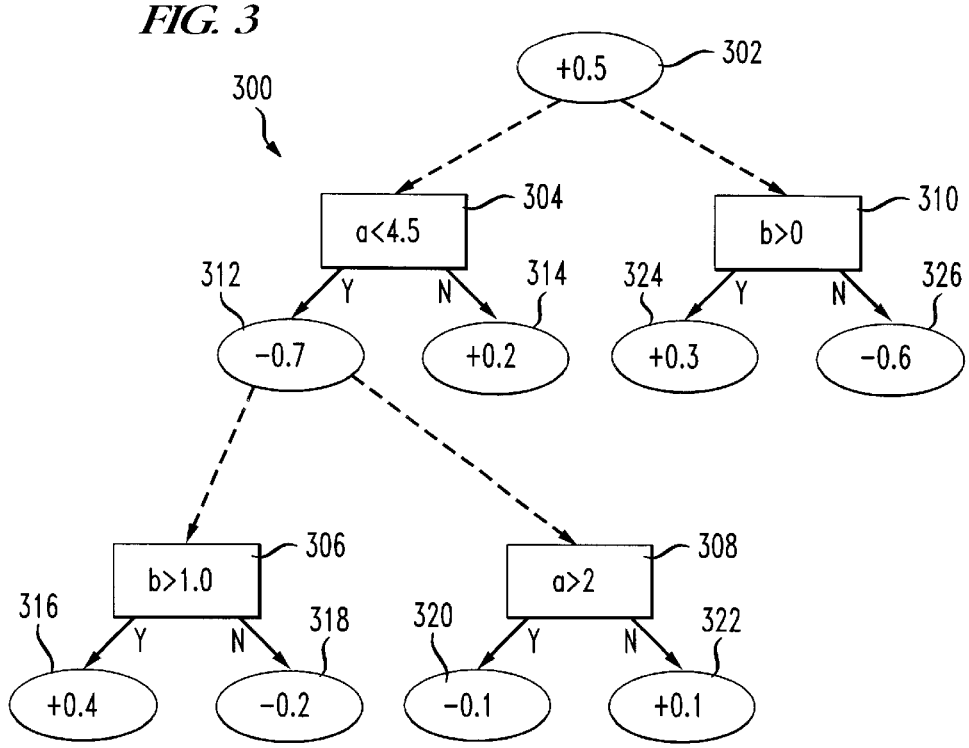
FIG. 3 is an exemplary diagram of a general alternating decision tree classifier.

FIG. 3 is an exemplary general alternating decision tree classifier 300 having a root prediction node 302, four decision nodes 304–310 and eight prediction nodes 312–322. As with the alternating decision tree 200 of FIG. 2, the general alternating decision tree consists of alternating layers of prediction nodes and decision nodes where each decision node and subsequent two prediction nodes can form a rule.

However, unlike the alternating decision tree classifier 200, a general alternating decision tree can have a plurality of decision nodes 304–308 attached to each prediction node 302 and 312–322, including the root prediction node 302. As a result, a plurality of unique paths can be mapped to the general alternating decision tree for each data instance presented to it. Despite any differences between the tree-based classifiers of FIGS. 2 and 3, the alternating decision tree of FIG. 2 can be considered a form of a general alternating decision tree having at most one rule per prediction node.

The general alternating decision tree classifier 300 works by first presenting a data instance, mapping each unique path along the classifier 300 that satisfies the rules as applied to elements of the data instance, adding the prediction nodes for every unique path, then classifying the sum by taking the sign of the sum.

For example, for the data instance (a, b)=(2.5, 2.5) applied to the exemplary general alternating decision tree classifier 300 of FIG. 3, the classifier 300 produces three unique paths, nodes 302-304-312-306-316, nodes 302-304-312-308-320 and nodes 302-310-324. The classification of (a, b)=(2.5, 2.5) is sign ((+0.5−0.7+0.4)+(+0.5−0.7−0.1)+(+0.5+0.3))= sign (+0.2−0.2+0.8)=sign (+0.8)=+1 with a measure of confidence is +0.8.

While using all of the paths mapped to general alternating decision tree classifier 300 can produce an accurate result, each individual path for any instance of data can classify a particular data instance on its own, each path producing varying results and measures of confidence. For example, the classification using only the first unique path is sign (+0.5−0.7+0.4)=sign (+0.2)=+1, the classification for the second unique path is sign (+0.5−0.7−0.1)=sign (−0.3)=−1, and the third classification is sign (+0.5+0.3)=sign (+0.8)=+1. While one of the three paths produces a result inconsistent with the other two, the classification for the data instance can be interpreted using a majority vote of the classifications for each unique path. For the example above, the majority vote of the three paths would lead to a classification of +1.

While exemplary tree-based classifiers 200 and 300 of FIGS. 2 and 3, respectively, both use two elements, it is to be appreciated that general alternating decision trees, including alternating decision trees, can be formed to handle any finite number of elements per data instance without departing from the spirit and scope of the present invention. The limits of general alternating decision tree classifiers are solely determined by the resources of the systems implementing them.

Figure 4:
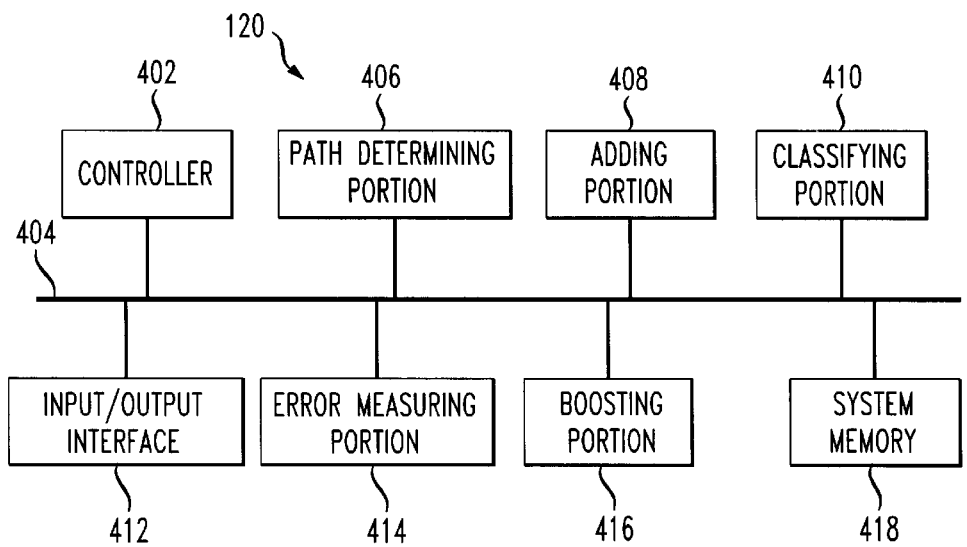
FIG. 4 depicts an exemplary block diagram of the classifying device of FIG. 1 for creating and using general alternating decision trees.

FIG. 4 shows an exemplary block diagram of the classification device 120 of FIG. 1 which can include a controller 402, a path determining portion 406, an adding portion 408, a classifying portion 410, an input/output interface 412, an error measuring portion 414, a boosting portion 416, and a system memory 418. The above components are coupled together through control/data bus 404.

In operation, and under control of the controller 402, the input/output interface 412 can receive a training set of data. The input/output interface 412 can receive training data from any device, such as a keyboard, scanner, disk drive, a universal asynchronous receiver-transmitter (UART), LAN, WAN, parallel digital interface, software interface or any combination of software and hardware in any form now known or later developed. Once the controller 402 imports the training data, the controller 402 can store the training data in the system memory 418.

The controller 402 can then build a general alternating decision tree classifier using the boosting portion 416 and the training data. The controller 402 can first determine the appropriate root prediction node of the general alternating decision tree classifier. The root prediction node can contain a value that is the best constant prediction for the training data set (i.e. the root prediction node contains an a priori assumption as to the classification of any instance of data based upon the training set of data). For example, if a set of training data had a "+1" classification 95% of the time, then the root prediction node would contain a high positive value indicating that any data instance presented to the classifier would very likely produce a "+1" result.

Next, the controller 402 can add one or more rules to the decision tree again using the boosting portion 416. Each rule added can increase the accuracy of the general alternating decision tree. To choose appropriate rules, the boosting portion 416 can use a boosting technique. As described above, Boosting techniques are discussed in detail in Schapire, Robert E. and Singer, Yoram, "Improved Boosting Algorithms Using Confidence-Rated Predictions" and Freund, Yoav and Mason, Llew, "The Alternating Decision Tree Learning Algorithm". However, it is to be appreciated that any technique now known or later developed capable of building complex classifiers by adding relatively simple rules may be used without departing from the spirit and scope of the present invention.

The controller 402 can then measure the performance of the general alternating decision tree using the error measuring portion 414, which can measure the performance of the general alternating decision tree using a variety of criteria. For example, the error measuring portion 414 may present the set of training data or a separate set of test data to the general alternating decision tree and determine the total number of errors or error rate produced by the general alternating decision tree. The error measuring portion 414 may also evaluate the error rate produced by the general alternating decision tree while considering the increased complexity caused by adding new rules to the decision tree. As the criteria for error performance can vary from application to application, it is to be appreciated that any criteria for evaluating error performance now known or later developed may be used without departing from the spirit and scope of the present invention.

If the error measuring portion 414 determines that the performance of the general alternating decision tree is not satisfactory, the controller 402, using the boosting portion 416, can further add one or more rules to the general alternating decision tree and again measure the performance of the modified general alternating decision tree using the error measuring portion 414. The general alternating decision tree can then be repeatedly boosted and tested in this fashion until the error measuring portion 414 determines that the general alternating decision tree performs satisfactorily.

Once a general alternating decision tree is built and tested, the controller 402 the, can receive data instances via the input/output interface 412 and store the data instances in the system memory 418. The controller 402 then applies the data instances to the general alternating decision tree. The controller 402, using the path determining portion 406, first maps every unique path on the general alternating decision tree according to the values of the elements of the data instance. Next, the controller 402, using the adding portion 408, adds every prediction node along every unique path to produce a sum. The controller 402 then classifies the sum using the classifying portion 410.

After one or more of the data instances are classified, the controller 402 can then export the classification results and/or the measures of confidence using the input/output interface 412.

While the exemplary system of FIG. 4 stores training data, data instances and the general alternating decision tree in system memory 418 consisting of high speed memory, such as a static random access memory, they may alternatively reside on any computer readable storage medium including a CD ROM, floppy disk, hard disk, Read Only Memory (ROM), dynamic RAM, and flash memory.

Figure 5:
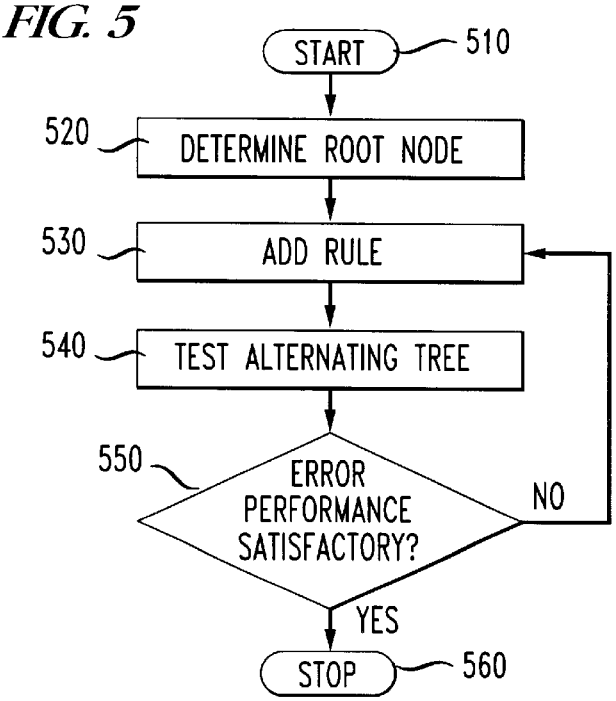
FIG. 5 is a flowchart illustrating an exemplary method for creating a general alternating decision tree classifier.

FIG. 5 depicts a flowchart outlining an exemplary process for creating a general alternating decision tree. The process begins in step 510 and proceeds to step 520. In step 520, the root prediction node is determined and placed at the root of the general alternating decision tree. Generally, the root prediction node can be the best constant prediction for the entire data set. The root prediction node can be derived using a boosting technique or may be derived by any other method, including any variant of boosting or any method that can generate a classification rule or aid in classification now known or later developed without departing from the spirit and scope of the present invention. The process then continues to step 530.

In step 530, a rule is added to the general alternating decision tree. As discribed above, each rule added consists of a decision node and two prediction nodes. The first rule added must necessarily be appended directly to the root prediction node, however, generally a new rule can be added to any existing prediction node in the general alternating decision tree, including the root prediction node. As with step 520, each rule may be added using a boosting technique or any other method now known or later developed capable of adding rules to a general alternating decision tree without departing from the spirit and scope of the present invention. The process then continues to step 540.

In step 540, the general alternating decision tree is tested. The general alternating decision tree can be tested using a set of test data instances with known classifications or with the set of training data used to form the general alternating decision tree. Error performance can be measured in a variety of ways including, but not limited to, measuring the absolute number of errors for a particular set of test data, measuring the error rate for a set of data, measuring the rate of change of the error rate for a set of data or determining any other aspect related to performance. As the criteria for error performance can vary from application to application, it is to be appreciated that any known or later developed testing technique may be used without departing from the spirit and scope of the present invention. The process then continues to step 550.

In step 550, the error performance criteria is evaluated. Error performance can be evaluated by comparing the measured error rate of step 540 to a predetermined acceptable level, by comparing the rate of change for each new rule added against a predetermined value or by evaluating the trade-off between the increased size and complexity of a general alternating decision tree with a new rule against the change in error rate. As the increase in performance may not warrant an increase in complexity, there may be no net advantage in continuing to add rules. Again, as the criteria for error performance can vary from application to application, it is to be appreciated that any criteria for evaluating error performance now known or later developed may be used without departing from the spirit and scope of the present invention.

If the error performance criteria is not satisfied, the process continues to step 560 where the operation ends, otherwise the operation returns to step 530 where another rule is added to the general alternating decision tree. The operation can continue to loop through steps 530, 540 and 550 until the error performance criteria is satisfied and the process ends at step 560.

Figure 6:
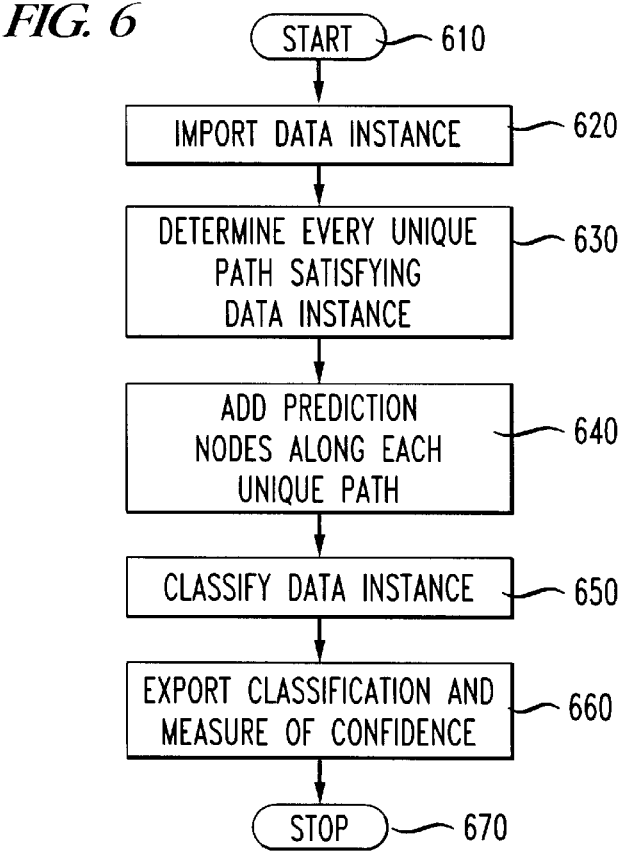
FIG. 6 is a flowchart illustrating an exemplary method for classifying an instance of data using a general alternating decision tree.

FIG. 6 is a flowchart outlining an exemplary process for classifying data instances using a general alternating decision tree. The process begins with step 610 and control continues to step 620. In step 620, a data instance is imported to be applied to the general alternating decision tree. Control then continues to step 630.

In step 630, every unique path in the general alternating decision tree satisfying the data instance is mapped. Next, in step 640, the prediction nodes occurring along each unique path are added to form a sum. Control then continues to step 650.

In step 650, the sum is classified by taking the sign of the sum to produce a binary result. Next, in step 660, the classification of the data instance along with the sum which provides a measure of confidence of the data classification is exported. Control then proceeds to step 670 where the process ends.

As shown in FIG. 4, the apparatus and methods of this invention are preferably implemented on a general purpose computer. However, the classification device 120 can also be implemented as part of a special purpose computer, a programmed microprocessor or micro-controller and peripheral integrated circuit elements, an Application Specific Integrated Circuit (ASIC), or other integrated, a hardware electronic or logic circuit such as a discrete element circuit, a programmable logic device such as a PLD, PLA, FPGA, or PAL, or the like. In general, any device which resides on a finite state machine capable of implementing the flowcharts shown in FIGS. 5 and 6 can be used to implement the classification device's 120 functions of this invention.

While this invention has been described in conjunction with specific embodiments thereof, it is evident that many alternatives, modifications, and variations will be apparent to those skilled in the art. Accordingly, preferred embodiments of the invention as set forth herein are intended to be illustrative not limiting. Various changes may be made without departing from the spirit and scope of the invention.

What is claimed is:

1. A method for building a general alternating decision tree classifier for classifying instances of data, comprising:

determining a root prediction node;

adding an initial rule having a decision node, a first prediction node and a second prediction node to the root prediction node using a boosting technique to form a general alternating decision tree classifier, the boosting technique being a technique for combining rules to form a more complex rule; and adding another rule having another decision node, another first prediction node and another second prediction node to one of the root prediction node and any existing prediction node of the general alternating decision tree classifier for forming the general alternating decision tree classifier.

2. The method of claim 1, further comprising:

testing the general alternating decision tree to determine an error condition;

determining the error condition is satisfactory; and repeating then steps of adding another rule, testing the general alternating decision tree and determining the error condition if the error condition is not satisfactory.

3. The method of claim 1, wherein the step of adding another a rule includes adding a rule to a prediction node having at least one preexisting rule appended to the prediction node.

4. A apparatus for building a general alternating decision tree classifier comprising:

a root prediction node device that determines a root prediction node of the general alternating decision tree classifier;

a rule adding device that adds one or more rules, each rule having a decision node, a first prediction node and a second prediction node, wherein each rule is added to one of the root prediction node and a prediction node of another rule on the general alternating decision tree classifier for forming the general alternating decision tree classifier.

5. The apparatus of claim 4, further comprising a testing device that determines an error criteria of the general alternating decision tree classifier.

6. The apparatus of claim 4, wherein the rule adding device uses a boosting technique, the boosting technique being a technique for combining rules to form a more complex rule.

7. The apparatus of claim 4, wherein the rule adding device can add a rule to a prediction node having at least one preexisting rule appended to the prediction node.

8. A classifying method in a general alternating decision tree with a root prediction node and a plurality of rules, wherein each rule has a decision node, a first prediction node and a second prediction node and wherein the root prediction node and each of the first prediction nodes and the second prediction nodes has a prediction value, comprising:

mapping at least one path in the general alternating decision tree using at least one element of a data instance and at least one rule of the plurality of rules;

adding the prediction values of the prediction nodes along each path mapped to produce a sum; and classifying the data instance based on the sum of the prediction values.

9. The method of claim 8, wherein the step of mapping includes mapping a plurality of paths.

10. A general alternating decision tree classifier for classifying instances of data, comprising:

a root prediction node;

a first rule with a decision node, a first prediction node and a second prediction node, wherein the decision node to the first rule is connected to the first prediction node; and a second rule with a decision node, a first prediction node and a second prediction node, wherein the decision node to the second rule is attached to one of the first prediction node of the first rule and the second prediction node of the first rule.

11. The classifier of claim 10, further comprising a third rule with a decision node, a first prediction node and a second prediction node, wherein the decision node of the third rule is attached to the first prediction node of the first rule.

12. The classifier according to claim 11, further comprising a fourth rule with a decision node, a first prediction node and a second prediction node, wherein the decision node to the fourth rule is connected to the root node.

* * * * *